(12) United States Patent
Andre

(10) Patent No.: US 8,844,869 B2
(45) Date of Patent: Sep. 30, 2014

(54) AIRCRAFT STRUCTURAL ASSEMBLY AND ASSOCIATED ASSEMBLING METHOD

(75) Inventor: Stéphane Andre, Paris (FR)

(73) Assignee: Dassault Aviation, Paris (FR)

(*) Notice: Subject to any disclaimer, the term of this patent is extended or adjusted under 35 U.S.C. 154(b) by 571 days.

(21) Appl. No.: 13/153,050

(22) Filed: Jun. 3, 2011

(65) Prior Publication Data

US 2011/0315820 A1    Dec. 29, 2011

(30) Foreign Application Priority Data

Jun. 4, 2010  (FR) ...................................... 10 02378

(51) Int. Cl.
*B64C 1/26* (2006.01)
*B64C 1/00* (2006.01)
*F16B 37/04* (2006.01)
*F16B 5/02* (2006.01)

(52) U.S. Cl.
CPC ............... *B64C 1/26* (2013.01); *F16B 37/047* (2013.01); *F16B 5/0291* (2013.01)
USPC .............................. 244/119; 244/131; 52/704

(58) Field of Classification Search
USPC ........... 244/117 R, 119, 131; 52/704; 403/24, 403/292
See application file for complete search history.

(56) References Cited

U.S. PATENT DOCUMENTS

| | | | |
|---|---|---|---|
| 2,747,638 A | | 5/1956 | Cederquist |
| 5,567,081 A | * | 10/1996 | Vallance ........................ 403/292 |
| 5,647,174 A | * | 7/1997 | Mattarelli ....................... 52/36.3 |
| 5,934,819 A | * | 8/1999 | Mangold .................... 403/408.1 |
| 6,663,314 B2 | * | 12/2003 | Bequet ....................... 403/408.1 |
| 7,658,348 B1 | | 2/2010 | Braly |
| 8,651,463 B2 | * | 2/2014 | Mao-Cheia et al. ........ 256/65.04 |

FOREIGN PATENT DOCUMENTS

EP     0061567 A2    10/1982
EP     1234984 A2    8/2002

* cited by examiner

*Primary Examiner* — Rob Swiatek
(74) *Attorney, Agent, or Firm* — McDermott Will & Emery LLP

(57) ABSTRACT

An assembly includes a structural wall and a composite wall extending in the extension of the structural wall and defining a second section positioned facing a first section of the wall. The assembly includes an elongated traction element received in a first passage made in the structural wall, the first passage opening out into the first section and into a cell made in the structural wall. The composite wall defines a second passage opening out into the second section and receiving the elongated element. The assembly includes a locking member added onto the elongated element. The composite wall delimits an access cavity connecting an outer surface of the composite wall to the second passage. The locking member is received into the access cavity.

17 Claims, 13 Drawing Sheets

AIRCRAFT STRUCTURAL ASSEMBLY AND ASSOCIATED ASSEMBLING METHOD

CROSS REFERENCE TO RELATED APPLICATIONS

The present application claims priority under 35 U.S.C. §119 to French Patent Application No. 10 02378, filed Jun. 4, 2010, which is incorporated herein by reference.

FIELD OF THE INVENTION

The present invention relates to an aircraft structural assembly for a composite wall.

BACKGROUND OF THE INVENTION

Prior art aircraft structural assemblies can include
a structural supporting wall, the structural wall having a first section along a first edge;
a composite wall assembled on the structural wall, the composite wall extending in the extension of the structural wall beyond the first edge and defining a second section positioned facing the first section;
means for attaching the structural wall with the composite wall including at least one elongated traction element received in a first passage made in the structural wall, the first passage opening out into the first section and into a cell made in the structural wall.

This assembly is in particular intended for connecting a composite structural element, such as for example a composite box or a skin for a bearing structure box, in particular a lower panel or an upper panel for a wing, a central plane or a tail, on a metal structural element, when the junction between these elements is strongly stressed with a normal force.

Such an assembly in particular applies to the junction between a wing in composite material and the fuselage of an aircraft, via tension bolts.

In a known way, certain aircrafts such as the Airbus A380 or the Boeing 787 comprise wing boxes in composite material. These boxes are attached on the central box of the fuselage via metal parts of the "fitting" type. These aircrafts include an internal fitting connected to a structural wall of the central box via a tension bolt as well as an external metal fitting on which is attached a composite wall of the box or of its skin.

These intermediate metal fittings guarantee good strength of this assembly notably when it is subject to a normal force.

Such an assembly however does not give entire satisfaction. Indeed, the presence of intermediate metal fittings significantly increases the weight of the aircraft, taking into account the individual weight of the fitting, as well as composite wall overthicknesses required for attaching the fitting.

Further, the presence of the fittings increases the cost of the assembly and makes its assembling more complex, while reducing robustness with regard to resistance to corrosion.

The presence of the fittings further possibly generates stresses which are set up during the assembling. Further, in the particular case of a wing, these connections are located at the tanks of fuel contained in the wing and therefore are sources of potential fuel leaks.

SUMMARY OF THE INVENTION

An object of the invention is to obtain an aircraft structural assembly with which a structural wall may be connected to a composite wall extending in the extension of the structural wall, the junction between the walls being intended to be strongly stressed with a normal force, the structural assembly being inexpensive, while generating few or no transverse stresses.

For this purpose, the object of the invention is an assembly of the aforementioned type, characterized in that the composite wall defines a second passage opening out into the second section and receiving the elongated element, the attachment means comprising a locking member added onto the elongated element, the composite wall delimiting a cavity for accessing the attachment means connecting a surface of the composite wall to the second passage, the locking member being received in the access cavity.

The assembly according to the invention may include one or more of the following features, taken individually or according to any technically possible combination(s):

said surface of the composite wall is the outer surface of this wall;
the elongated element comprises a rod and a retaining head protruding radially at one end of the rod, the retaining head being received into the cell;
a mean plane of the structural wall in the vicinity of the first section defines with a mean plane of the composite wall in the vicinity of the second section an angle comprised between 0° and 30°;
the angle formed between the axis of the access cavity and the mean plane along which extends the composite wall is comprised between 60° and 120°;
the axis of the elongated element positioned in the second passage is aligned or parallel with the neutral fiber of the composite wall;
the axis of the elongated element is tilted with respect to the neutral fiber of the composite wall, the intersection between the axis of the elongated element in the second passage and the neutral fiber being advantageously located in the vicinity of the junction between the second passage and the access cavity;
the access cavity is a blind cavity;
the access cavity opens out in another surface of the composite wall, the assembly including a member for obturating at least one end of the access cavity, added into the access cavity;
the assembly includes at least one transverse compression member of the composite wall, the compression member crossing the composite wall between the outer surface and an opposite inner surface, while being located away from the second passage;
the composite wall comprises a central layer in which the second passage is made and two opposite layers located on either side of the central layer, the central layer having a drape distinct from the drape of the opposite layers, the drape of the central layer advantageously having a number of folds oriented parallel to the axis of the elongated element which is greater than the number of folds oriented parallel to the axis of the elongated element in the drape of the opposite layers;
the assembly includes a side junction panel transversely interposed between the first section and the second section;
the first section substantially extends in a plane tilted with respect to the plane of the second section, the assembly comprising an intermediate shim having a supporting surface for the second section, on which is applied the second section and an opposite surface parallel to the plane of the first section;
the composite wall forms a skin for a bearing structure box, advantageously a lower panel or an upper panel for a wing, for a central plane or for a tail, the structural wall defining a portion of a central structure box of an aircraft.

The object of the invention is also a method for assembling a structural assembly as defined above, characterized in that it includes the following steps:
  providing the structural wall and the composite wall;
  positioning the composite wall in the extension of the structural wall in order to place the first section facing the second section;
  introducing the elongated element into the first passage and into the second passage;
  introducing the locking member into the access cavity;
  engaging the elongated element with the locking member in order to mechanically lock the composite wall with the structural wall.

BRIEF DESCRIPTION OF THE DRAWINGS

The invention will be better understood upon reading the description which follows, only given as an example and made with reference to the appended drawings, wherein.

DETAILED DESCRIPTION OF THE INVENTION

Figure 1:
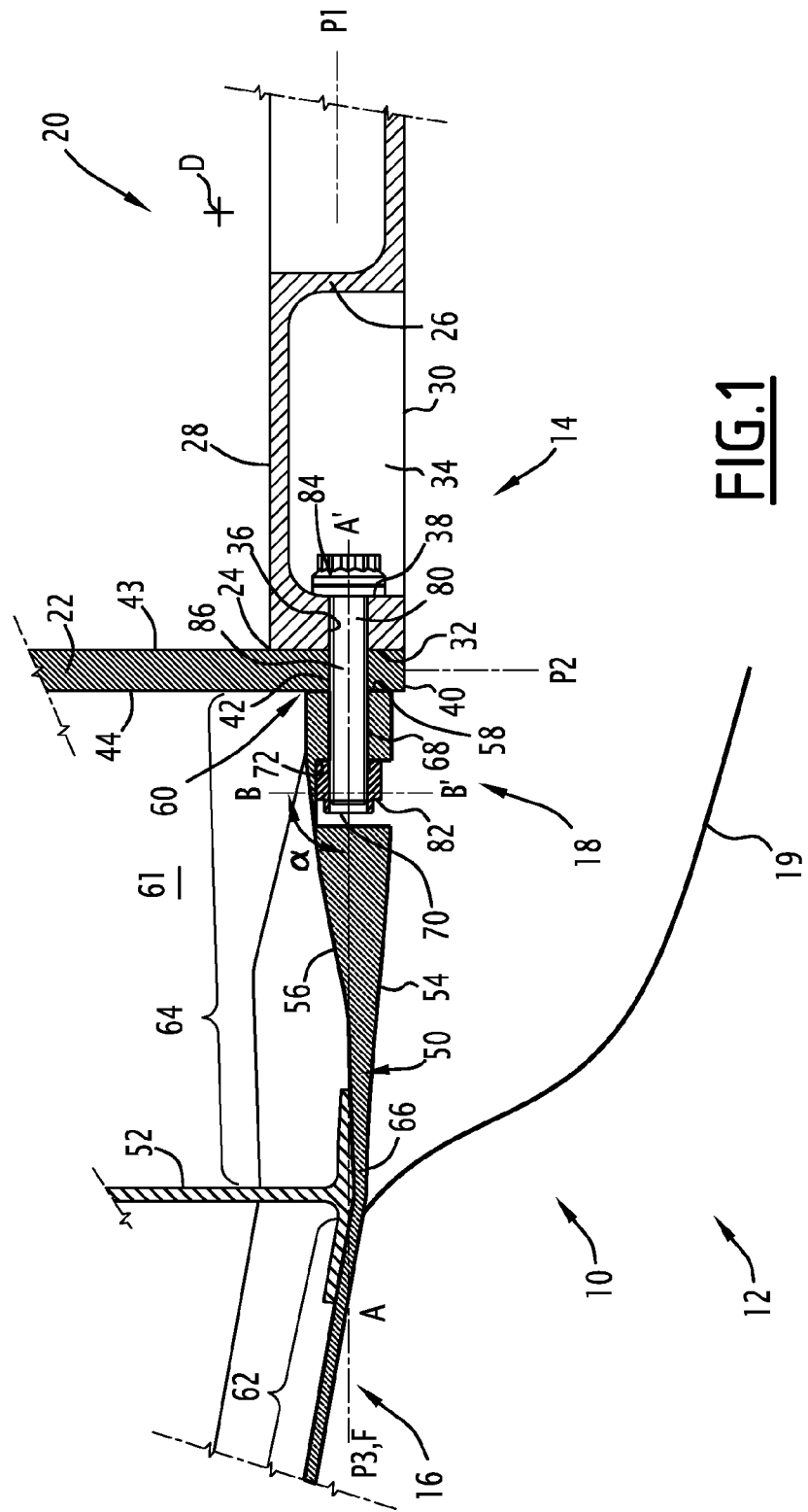
FIG. 1 is a sectional view taken along a transverse plane of a structural assembly of a first aircraft according to the invention.

FIG. 1 illustrates a structural assembly 10 according to the invention of a first aircraft 12. This structural assembly 10 includes a first structure element 14 and a second structural element 16 at least partly made in a composite material, the second structure element 16 being assembled on the first structure element 14 via attachment means 18.

The first structure element 14 is for example a central fuselage box, in metal material. The second structure element 16 is for example a wing or a tail comprising skin panels intended to be attached onto the first structure element 14 while being stressed by a normal force when the aircraft moves in a mass of air, in particular during a flight.

In the particular example illustrated in FIG. 1, the first structure element 14 is a central fuselage box and the second structure element 16 is a wing. It further comprises a so-called "Karman" lower wall 19 positioned underneath the first element 14 and the second element 16.

The first structure element 14 includes a central plane 20 extending along a general direction D, horizontal in FIG. 1. It advantageously includes a side junction panel 22 applied against the central plane 20 along a side edge 24 of the central plane 20. In the example illustrated in FIG. 1, the side edge 24 is located on the left of the central plane 20.

The central plane 20 is formed by a structural wall 26 extending in a mean general plane P1, illustrated as horizontal in FIG. 1.

The structural wall 26 has an upper surface 28 and a lower surface 30 connected together along the side edge 24 by a first section 32 delimited in the thickness of the wall 26.

The wall 26 is advantageously made in metal material.

The structural wall 26 delimits along its side edge 24, away from the section 32, a plurality of cells 34 for inserting attachment means 18.

Each cell 34 opens out into the lower surface 30. Each cell 34 is blind and is obturated towards the upper surface 28. The cells 34 are distributed axially along the direction D while being spaced apart from each other along this direction D.

For each cell 34, the structural wall 26 defines a first through-passage 36 for receiving the attachment means 18. The first passage 36 extends substantially transversely with respect to the direction D along a passage axis A-A', which is horizontal in the example illustrated in FIG. 1.

The first through-passage 36 opens interiorly into the cell 34 and exteriorly into the section 32 in a perpendicular way or tilted by an angle of less than 30° with respect to the normal to a directing surface of the section 32.

Advantageously this angle may be less than 20°.

The passage 36 has a maximum transverse extension, taken perpendicularly to the axis A-A', of less than the height of the cell 34, taken perpendicularly to the axis A-A'.

The first passage 36 and the cell 34 thus delimit around the first passage 36 in the cell 34, a supporting annular shoulder 38 for the attachment means 18.

The junction panel 22 extends in a general plane P2 substantially perpendicular to the plane P1 along the side edge 24. It is advantageously made in metal material. The junction panel 22 is connected to the fuselage.

The junction panel 22 has a lower edge 40 which is flush with the lower surface 30 of the structural wall 26 in the vicinity of the section 32.

In the vicinity of its lower edge 40, the side junction panel 22 defines an intermediate through-passage 42 with a section similar to the section of the first through-passage 36. The intermediate passage 42 extends facing the first passage 36 when the junction panel 22 is fixed against the section 32 of the structural wall 26.

The side junction panel 22 delimits an inner surface 43 applied onto the section 32 and an outer surface 44 substantially parallel to the section 32 and intended to receive as a support the second structure element 16.

The intermediate passage 42 opens out interiorly into the first through-passage 36 and exteriorly through the outer surface 44. It extends coaxially with the first passage 36.

In the example illustrated in FIG. 1, the second structure element 16 includes a composite wall 50 intended to be attached onto the structural wall 26 and advantageously an internal frame 52 forming a bearing plane box.

The composite wall 50 is made on the basis of a composite material such as a laminate in carbon fibers and epoxy resin.

The composite wall 50 for example forms a skin of the box 52, such as a wing skin. It includes a first surface 54 intended to form an outer surface of the structure element 16 and a second structure 56 intended to form an inner surface of this structure element.

The composite wall 50 defines a second section 58 connecting the first surface 54 to the second surface 56 along a second side edge 60 of the composite wall 50, placed facing the first edge 24 of the structural wall 26.

The portion of the surface 54 which is not covered by the wall 19 is intended to be placed in contact with the mass of air in which the aircraft 12 flies. The second surface 56 is intended to delimit for example an interior fluid tank within the second structural element, such as a fuel tank 61.

The composite wall 50 has an outer region 62 and an inner region 64 for connecting to the central plane 20. In this example, the regions 62, 64 define between them a break 66.

The inner region 64 has a thickness, taken as a section in a vertical plane passing through the axis A-A' which increases upon moving towards the central plane.

The second section 58 is defined by the thickness of the composite wall 50 along the edge 60, between the first surface 54 and the second surface 56. It is applied against the outer surface 44 of the junction panel 22. It extends facing the first section 32.

At least in the inner region 64, the composite wall 50 defines a mean plane P3 which forms a zero or small angle, advantageously of less than 30°, with the general plane P1 of the structural wall 26.

Thus, the composite wall 50 laterally extends the structural wall 26 along the side edge 24.

In the example illustrated in FIG. 1, the mean plane P3, taken at the second section 58 forms a zero angle with the mean plane P1, taken at the first section 32.

According to the invention, the attachment means 18 are directly received in the composite wall 50. For this purpose, the composite wall 50 delimits a second receiving passage 68 and a transverse cavity 70 for accessing the second passage 68.

The second passage 68 extends along the axis A-A'. It opens out interiorly into the second section 58 in a perpendicular way or tilted by an angle of less than 30° with respect to the normal to the directing surface of the section 58. The second passage 68 opens out exteriorly into the cavity 70.

It has a cross-section relatively to the axis A-A substantially equal to the cross-section of the first passage 36, and of the intermediate passage 42.

In this example, in the area of the composite wall 50, extending between the frame 52 and the panel 22, the axis A-A' is parallel to the general plane P3 which coincides with the neutral fiber F of the composite wall 50. The plane grouping the whole of the points of a structure where the elongation consecutive to the application of a flexural moment is zero, is called a neutral fiber F.

The fact that the planes P3 and F coincide thereby gives the possibility of not generating any flexural force in the composite wall 50.

According to the invention, the cavity is made transversally with respect to the axis A-A' of the second passage 68 along a substantially vertical axis B-B' in FIG. 1. The angle α (FIGS. 1 and 4) formed between the axis B-B' and the plane P3 is advantageously comprised between 60° and 120°. In the example illustrated in FIG. 1, the cavity 70 is blind. It exclusively opens out into the first surface 54. The cavity 70 is on the other hand obturated upwards by the wall 50 towards the second surface 56 so that no fluidic communication exists between the tank 61 and the outside of the assembly 16 through the cavity 70.

In this example, the cavity 70 has a smaller section, taken along a horizontal plane passing through the axis A-A', than the section of each cell 34, advantageously smaller by a factor at least equal to two relatively to the section of each cell 34.

The cavity 70 is advantageously cylindrical with an axis B-B'.

The cavity 70 and the second passage 68 delimit between them a second retaining shoulder 72 oriented opposite to the first annular shoulder 38.

The attachment means 18 include a longitudinal traction element 80 inserted through the cell 34, the first through-passage 36, the intermediate passage 42, and the second through-passage 68 in order to protrude into the cavity 70, and a locking member 82 of the longitudinal element 80, attached on the longitudinal element 80 in the cavity 70.

Figure 13:
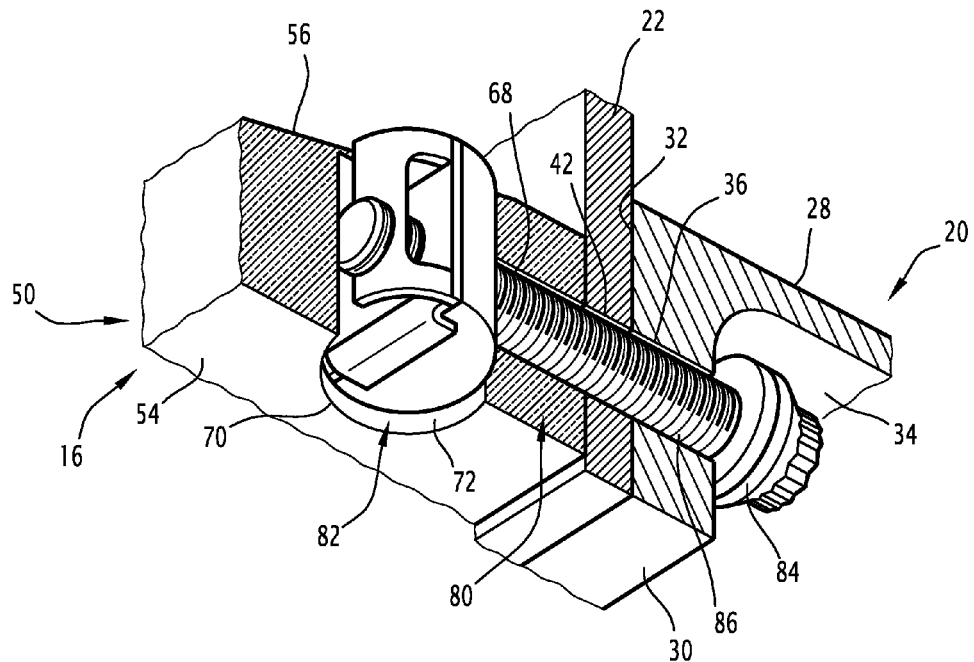
FIG. 13 is a partly sectional perspective view of a detail of the means for attaching the structural wall with the composite wall.

In the example illustrated in FIG. 1 and in more detail in FIG. 13, the longitudinal element 80 is formed by a tension bolt including a head 84 received in the cell 34 and a threaded rod 86 engaged complementarily through the passages 36, 42 and 68 in order to be received in the locking member 82.

The rod 86 then extends along the axis A-A'. It has a cross-section mating that of the passages 36, 42, 68. The head 84 protrudes radially with respect to the rod 86.

The locking member 82 is for example formed by a barrel nut schematically illustrated in FIG. 1 and illustrated in detail in FIG. 13. This nut delimits an inner cavity provided with a thread for engaging and retaining the free end of the rod 86.

When the attachment means 18 are active, the longitudinal element 80 is locked by the locking member 82. For this purpose, the free end of the rod 86 is received in the cavity of the locking member 82. The head 84 is flattened against the first annular shoulder 38, while the locking member 82 is flattened against the mating retaining shoulder 72.

Thus, the composite wall 50 is firmly retained by its section 58 against the section 32 of the structural wall 26, with interposition of the side junction panel 22.

The thereby formed link has strong robustness when it is stressed by a normal force while retaining strong robustness against shear forces.

The strong robustness to stresses by a normal force is particularly important because of the low angle formed by the respective mean planes P1 and P3 of the structural wall 26 and of the composite wall 50 in the vicinity of the respective sections 32, 58 and the problems of normal force transfer which result from this.

It is thus possible to attach these walls 50, 26 by their sections while retaining excellent mechanical properties by simple and inexpensive means. Indeed, the cavity 70 and the passage 68 are directly made in the composite wall 50 and directly receive the longitudinal elements 80 positioned in the structural wall 26, without it being necessary to position an intermediate part such as a fitting or a splice plate between the composite wall 50 and the structural wall 26.

The structural assembly 10 according to the invention is therefore particularly lightweight and inexpensive, while retaining great robustness, notably towards corrosion, since no intermediate metal fitting is used.

The assembly between the structural wall 26 and the composite wall 50 generates few or no transverse stresses, which is favorable to the mechanical strength of the assembly.

Further, when the cavity 70 is blind, the seal of a fluid tank delimited by the composite wall 50, such as a fuel tank 61, is ensured.

In order to assemble the structural assembly 10, the structural wall 26, the side junction panel 22 and the composite wall 50 are brought into contact with each other.

The first section 32 of the structural wall 26 is applied against the inner surface 43 of the side junction panel 22, while the second section 58 of the composite panel 50 is applied onto the outer surface 44 of the side junction panel 22. The passages 36, 42 and 68 are then aligned coaxially along the axis A-A'.

And then the locking member 82 is introduced into the cavity 70 and is maintained in position in the cavity 70. The longitudinal traction element 80 is then introduced into the cell 34, and is then inserted by the free end of the rod 86 successively through the first though-passage 36, the intermediate passage 42 and the second passage 68 until it enters into contact with the locking member 82. Subsequently, the head 84 of the longitudinal element is driven into rotation in order to screw the rod 86 into the locking member 82 and thereby apply a determined clamping force between the shoulders 72 and 38.

It will be noted that the sectional view of FIG. 1 corresponds to a common section representative of the structural assembly, but the orientation of the different mentioned planes may vary from one section to the other along the chord of the structure element 14. This also applies for the other embodiments described below.

Figure 2:
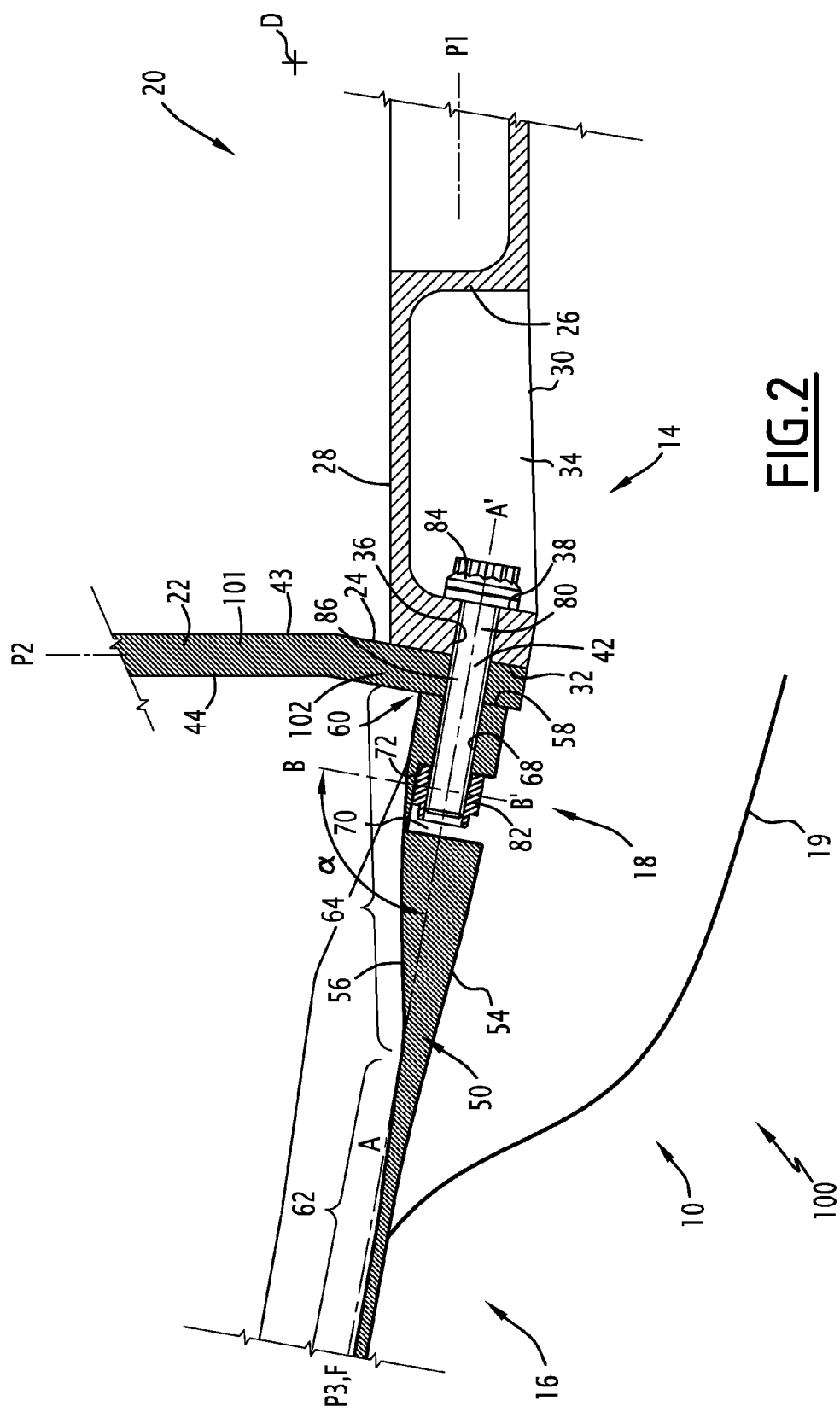
FIG. 2 is a similar view to FIG. 1 of a structural assembly of a second aircraft according to the invention.

The structural assembly 10 of a second aircraft 100 according to the invention is illustrated in FIG. 2. Unlike the structural assembly 10 of the first aircraft 12, the first section 32 extends in a plane tilted with respect to a plane perpendicular to the general plane P1 of the structural wall 26.

The side junction panel 22 comprises a lower portion 102 tilted relatively to an upper portion 101 located in the plane P2, with an angle equal to the angle between the planes P1 and P3 which allows the axis A-A' to be aligned with the plane P3 and thus not generate any transverse force in the composite.

The configuration of the cell 34 is further modified so that the retaining shoulder 38 extends in a plane perpendicular to the axis A-A'.

The composite wall 50 extends in the vicinity in the second section 58, in a mean plane P3 perpendicular to the plane of the first section 32 forming an angle of less than 30° with the plane P1.

The second section 58 of the composite wall 50 is applied against the outer surface 44 of the junction panel 102 while being positioned parallel to the first section 32.

The axis A-A' of the passages 36, 42 and 68 extends parallel to the plane P3, in a tilted way relatively to the plane P1.

Moreover, the attachment means 18 remain identical with those discussed in the structural assembly 10 of FIG. 1.

With such an assembly it is possible to do without the making of a break 66 as illustrated in FIG. 1 for the composite wall 50 which significantly simplifies the manufacturing of such a composite wall.

The method for assembling the structural assembly 10 of FIG. 2 is moreover similar to the method for assembling the assembly 10 of FIG. 1.

Figure 3:
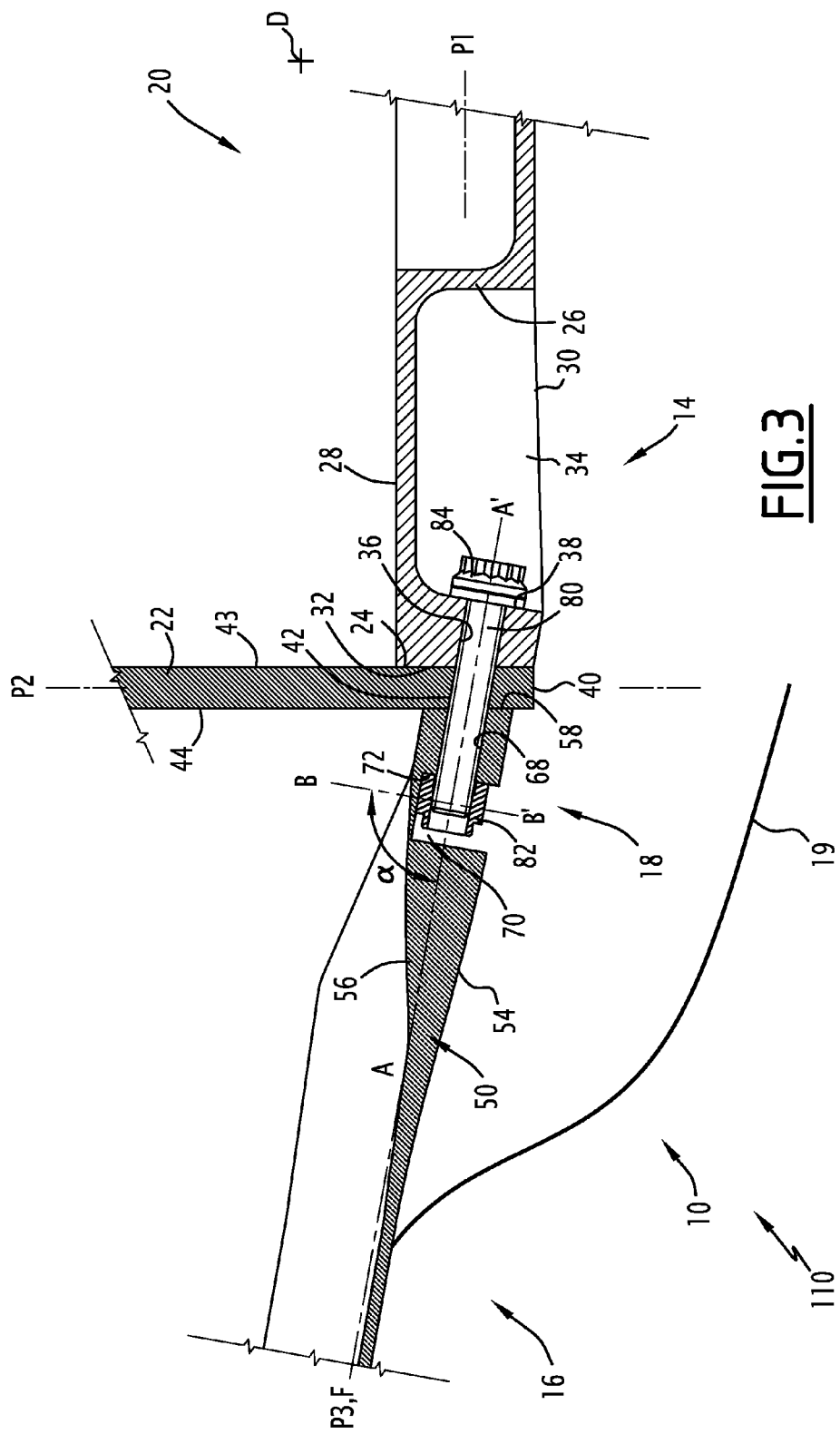
FIG. 3 is a similar view to FIG. 1 of a structural assembly of a third aircraft according to the invention.

The structural assembly 10 of a third aircraft 110 according to the invention is illustrated in FIG. 3. As in the assembly 10 of FIG. 1, and unlike the assembly 10 of FIG. 2, the first section 32 extends in a plane substantially perpendicular to the mean plane P1 of the structural wall 26. The side junction panel 22 extends in a plane P2 substantially perpendicular to the plane P1.

As in the assembly 10 of FIG. 2, the composite wall 50 extends in a mean plane P3 tilted relatively to the mean plane P1 of the structural wall 26.

Unlike the assembly 10 illustrated in FIG. 2, the second section 58 of the composite wall 50 is positioned in a plane tilted relatively to the perpendicular to the mean plane P3. This tilted plane is parallel to the plane P2.

In the assembly 10 of FIG. 3, the axis A-A' of the first through-passage 36, of the intermediate passage 42 and of the second passage 68 is tilted relatively to the mean plane P1 of the structural wall 26 and is aligned with P3. It forms with the normal to a directing surface of the section 32, an angle of less than 30°.

The configuration of the cell 34 is further modified so that the retaining shoulder 38 extends in a plane perpendicular to the axis A-A' in a tilted way relatively to the plane of the section 32.

With this embodiment it is possible to keep a junction plate planar while minimizing the transverse forces in the composite.

The assembling of the assembly 10 illustrated in FIG. 3 is moreover similar to the assembling of the one illustrated in FIG. 1.

Figure 4:
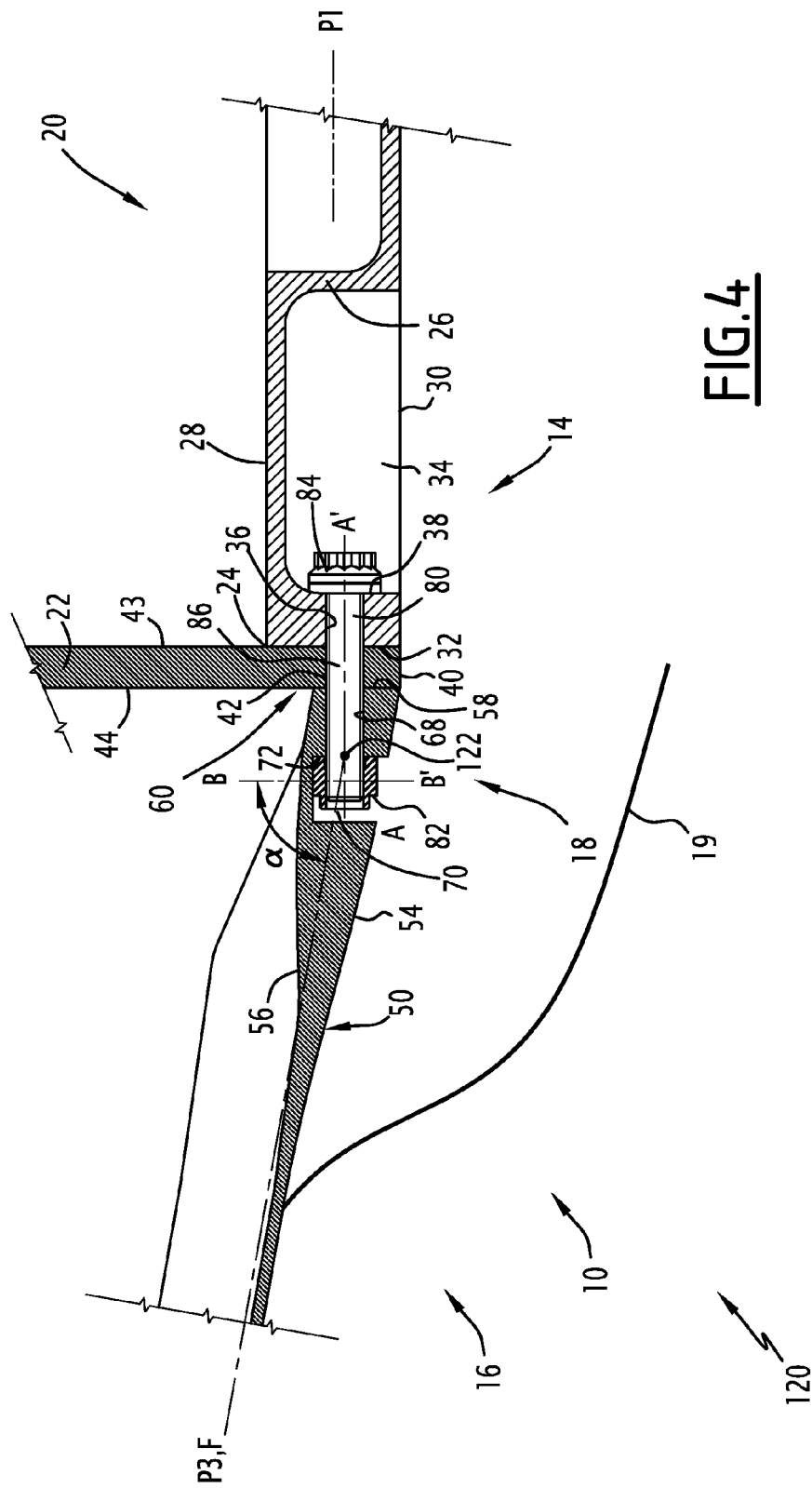
FIG. 4 is a sectional view taken along a transverse plane of a structural assembly of a fourth aircraft according to the invention.

The assembly 10 of a fourth aircraft 120 according to the invention is illustrated in FIG. 4. Unlike the assembly 10 illustrated in FIG. 3, the axis A-A' of the first passage 36, of the intermediate passage 42 and of the second passage 68 is perpendicular to the plane of the first section 32 and is parallel or coincides with the mean plane P1 of this structural wall 26.

Thus, the axis A-A" is tilted relatively to the mean plane P3 of the composite wall 50 in the vicinity of the second section 58.

The axis A-A' is tilted relatively to the neutral fiber F of the composite wall 50, the intersection between the neutral fiber F and the axis A-A' is preferably positioned at the junction 122 between the second passage 68 and the cavity 70. With this positioning of the intersection between the neutral fiber F and the axis A-A' it is possible to improve the robustness of the assembly 10 and minimize the flexural forces generated in this assembly.

It will be noted that alternatively the intersection between the neutral fiber F and the axis A-A' may also be slightly shifted from the junction 122 along the axis A-A' towards the section 58.

Figure 5:
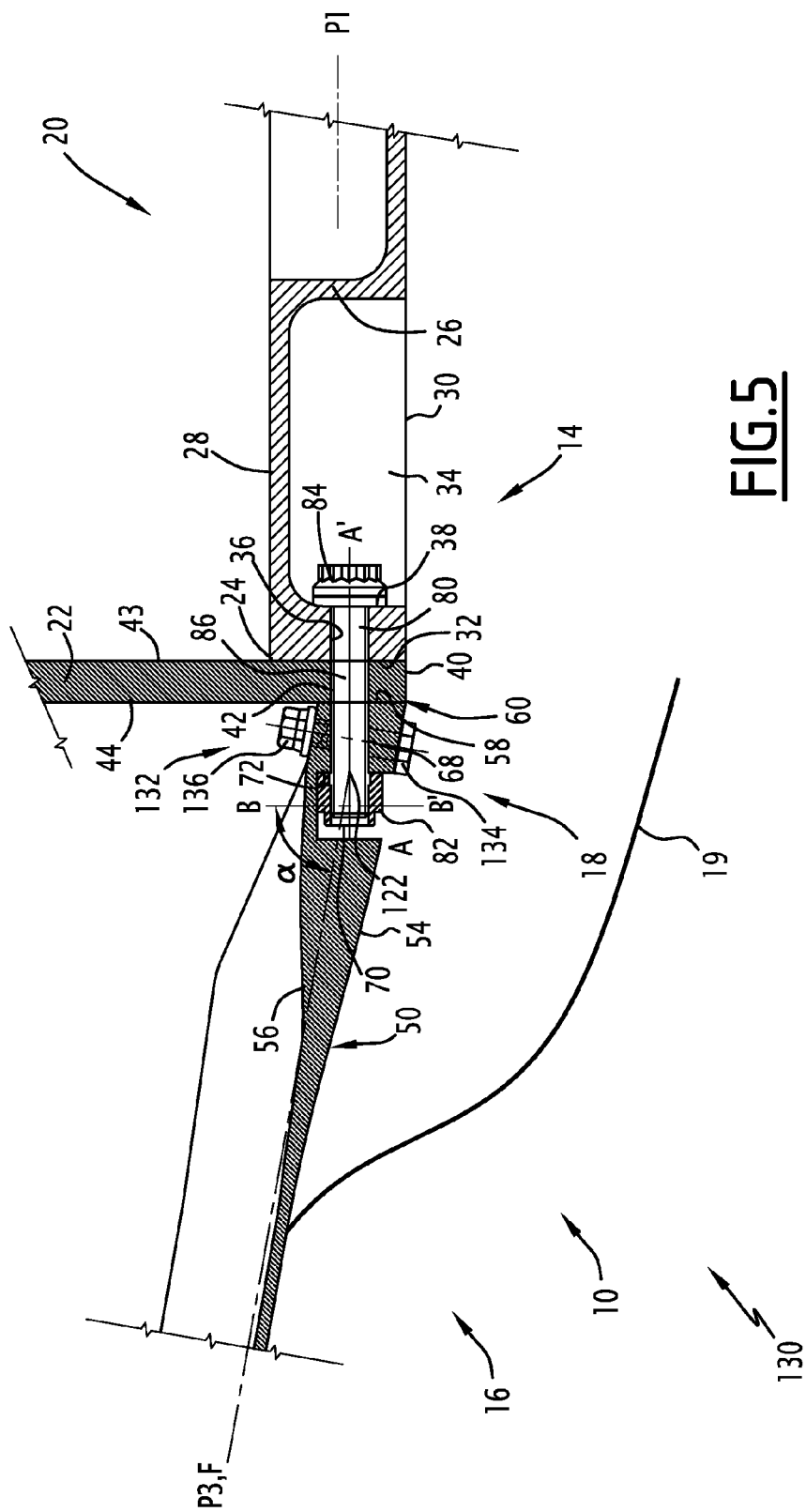
FIG. 5 is a sectional view taken along a transverse plane of a structural assembly of a fifth aircraft according to the invention.
Figure 6:
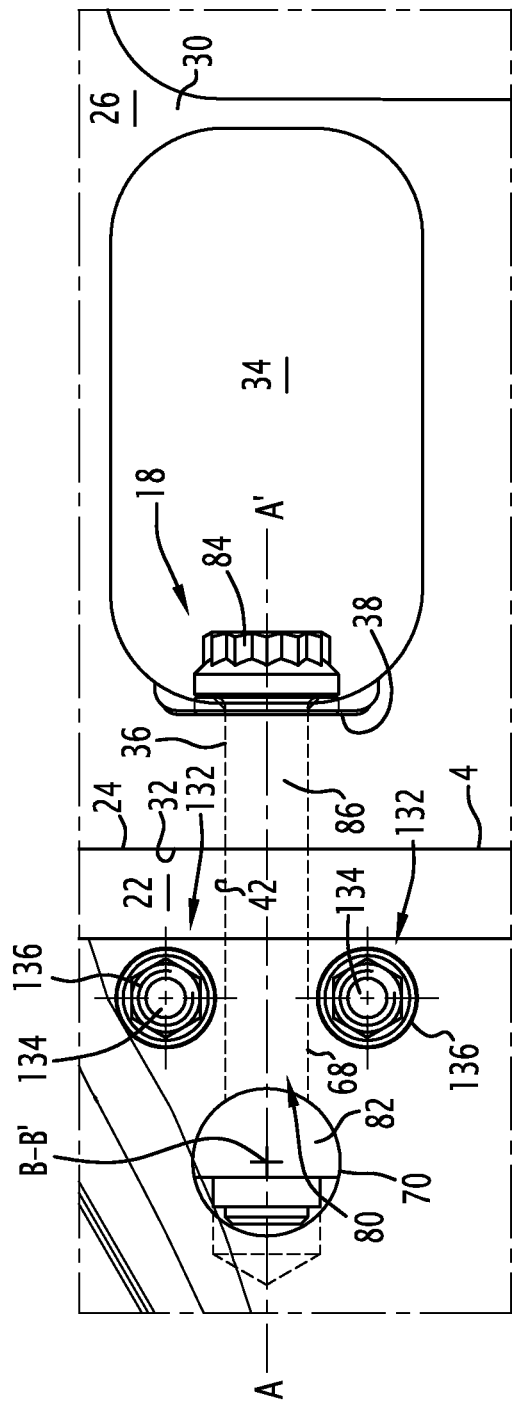
FIG. 6 is a view from below of a detail of the assembly of FIG. 5.

A structural assembly 10 of a fifth aircraft 130 according to the invention is illustrated in FIGS. 5 and 6.

Unlike the assembly 10 of the fourth aircraft 110, this assembly comprises two compression members 132 of the composite wall 50 along its thickness, positioned on either side of each traction element 80 in the composite wall 50.

Each member 132 includes a bolt 134 passing through the composite wall 50 over the whole of its thickness in the vicinity of its second section 58 and a nut 136 for fastening the bolt 134. The assemblies 132 are positioned interiorly relatively to the cavity 70, on either side of the second passage 68, totally away from the second passage 68.

The bolt 134 has a head applied on one of the first surface 54 and of the second surface 56, while the nut 136 is applied on the other one of the first surface 54 and of the second surface 56.

Thus, the composite wall 50 is locally compressed between its first surface 54 and its second surface 56 along an axis substantially perpendicular to its neutral fiber F.

The thereby set-up transverse compression prevents possible delamination of the composite making up the wall 50.

The method for assembling the assembly 10 illustrated in FIG. 5 differs from the method for assembling the assembly 10 illustrated in FIG. 4, in that before the step for placing the attachment means 18, the compression members 132 are installed through the composite wall 50.

Figure 7:
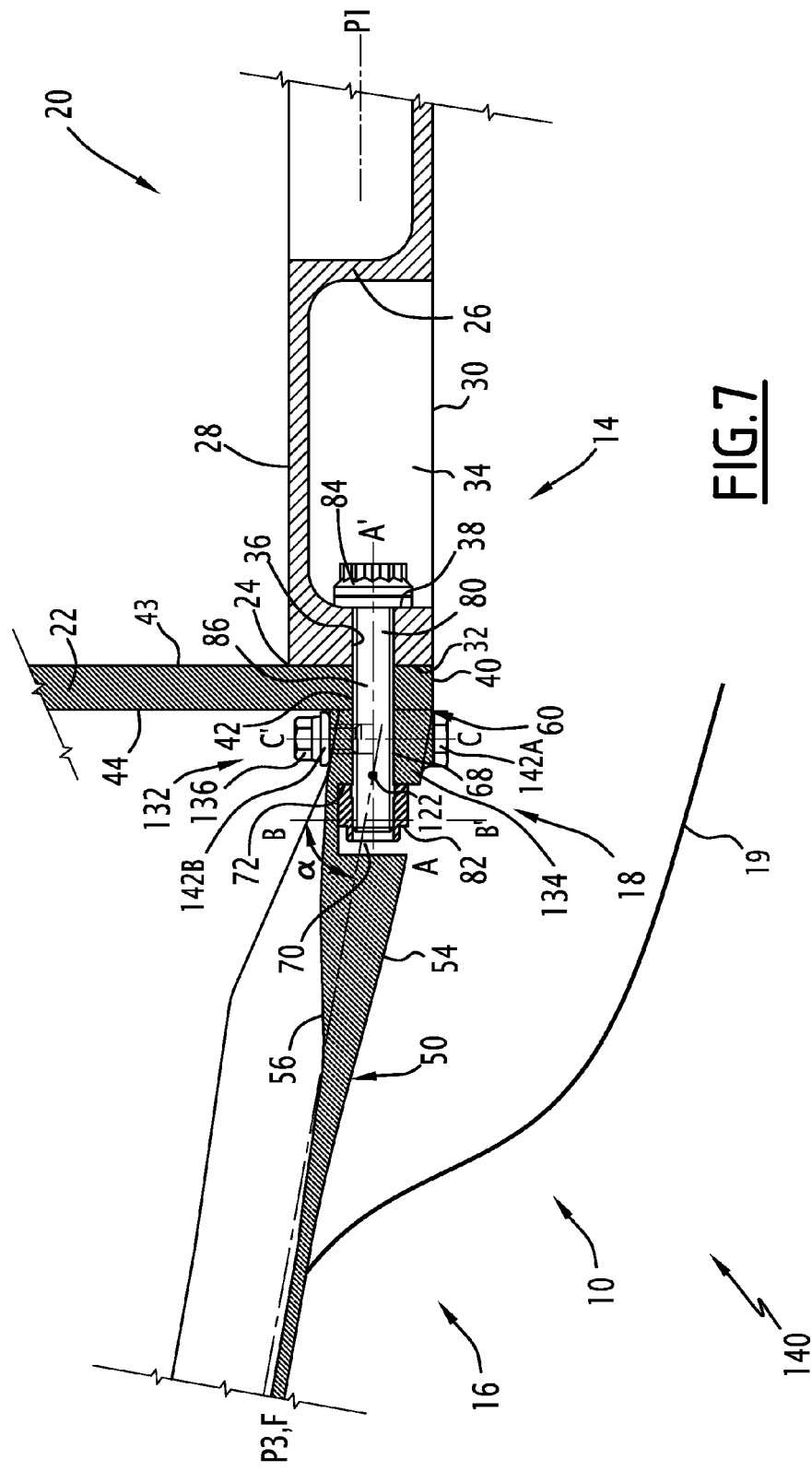
FIG. 7 is a sectional view taken along a transverse plane of a structural assembly of a sixth aircraft according to the invention.

FIG. 7 illustrates a structural assembly 10 of a sixth aircraft 140 according to the invention. Unlike the assembly 10 of the fifth aircraft 130, the composite wall 50 includes a portion 142A facing the head of the bolt 134 and a portion 142B facing the nut 136.

The portions 142A and 142B have the shape of a wedge and thereby each define a surface parallel to the axis A-A' of the second passage 68, with which a supporting plane perpendicular to the axis A-A' may be restored to the members 132. Thus, unlike the assembly 10 illustrated in FIG. 5, the compression assembly 132 passes through the composite wall 50 between the first surface 54 and the second surface 56 along an axis C-C' perpendicular to the axis A-A' of the second passage 68.

Figure 8:
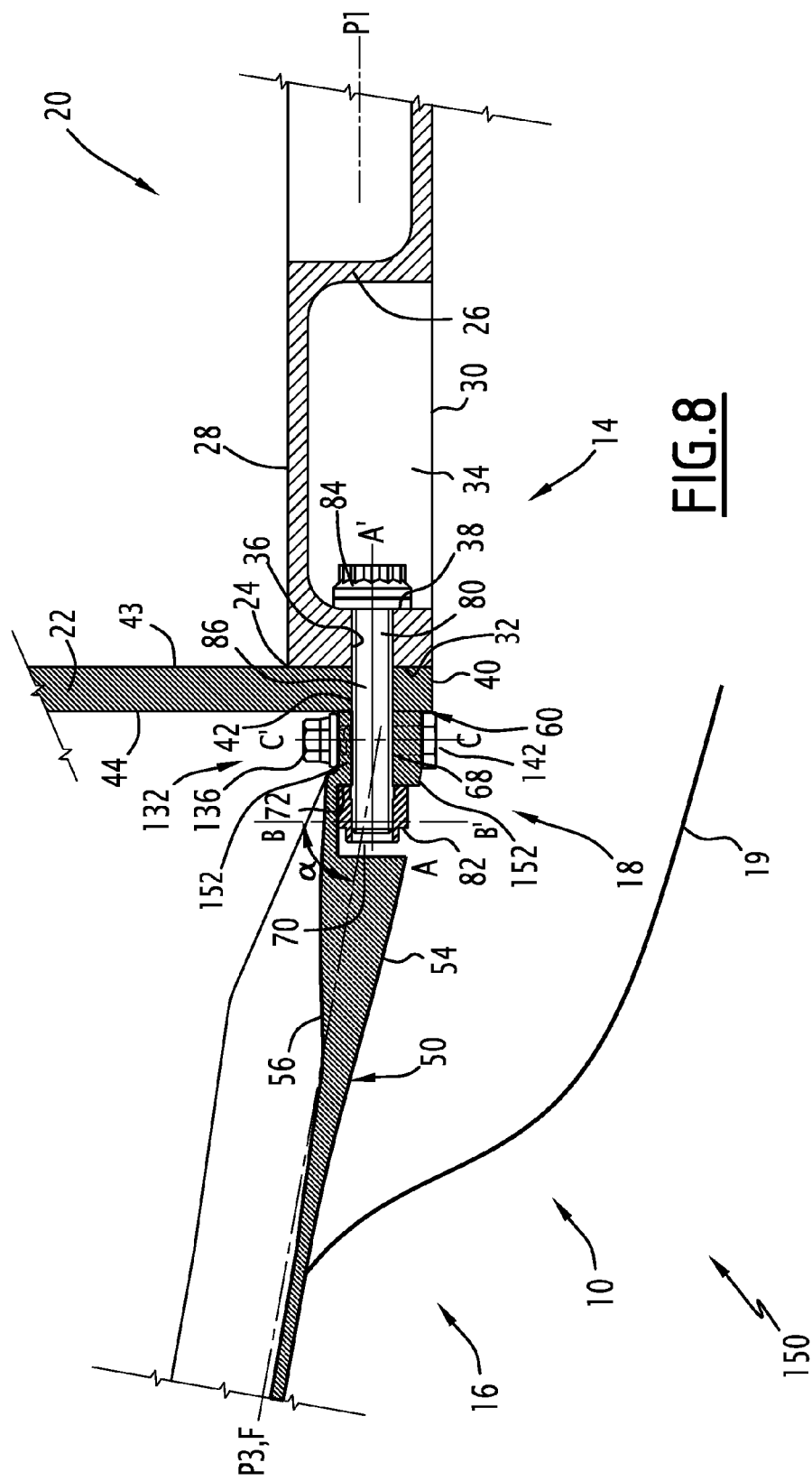
FIG. 8 is a sectional view taken along a transverse plane of a structural assembly of a seventh aircraft.

A structural assembly 10 of a seventh aircraft 150 according to the invention is illustrated in FIG. 8.

Unlike the assembly 10 of the sixth aircraft 140, the composite wall 50 on its first surface 54 and on its second surface 56, in the vicinity of the second edge 60, adjacent to the second section 58, defines parallel flats 152 positioned in a plane parallel to the axis A-A', and also parallel to the mean plane P1.

Each of the flats 152 respectively defines a supporting surface of the bolt's head 134 and of the nut 136. Thus, each compression assembly 132 locally maintains the composite wall 50 compressed between the first surface 54 and the second surface 56 along an axis C-C perpendicular to the axis A-A' of the plane of the first surface 32.

Figure 9:
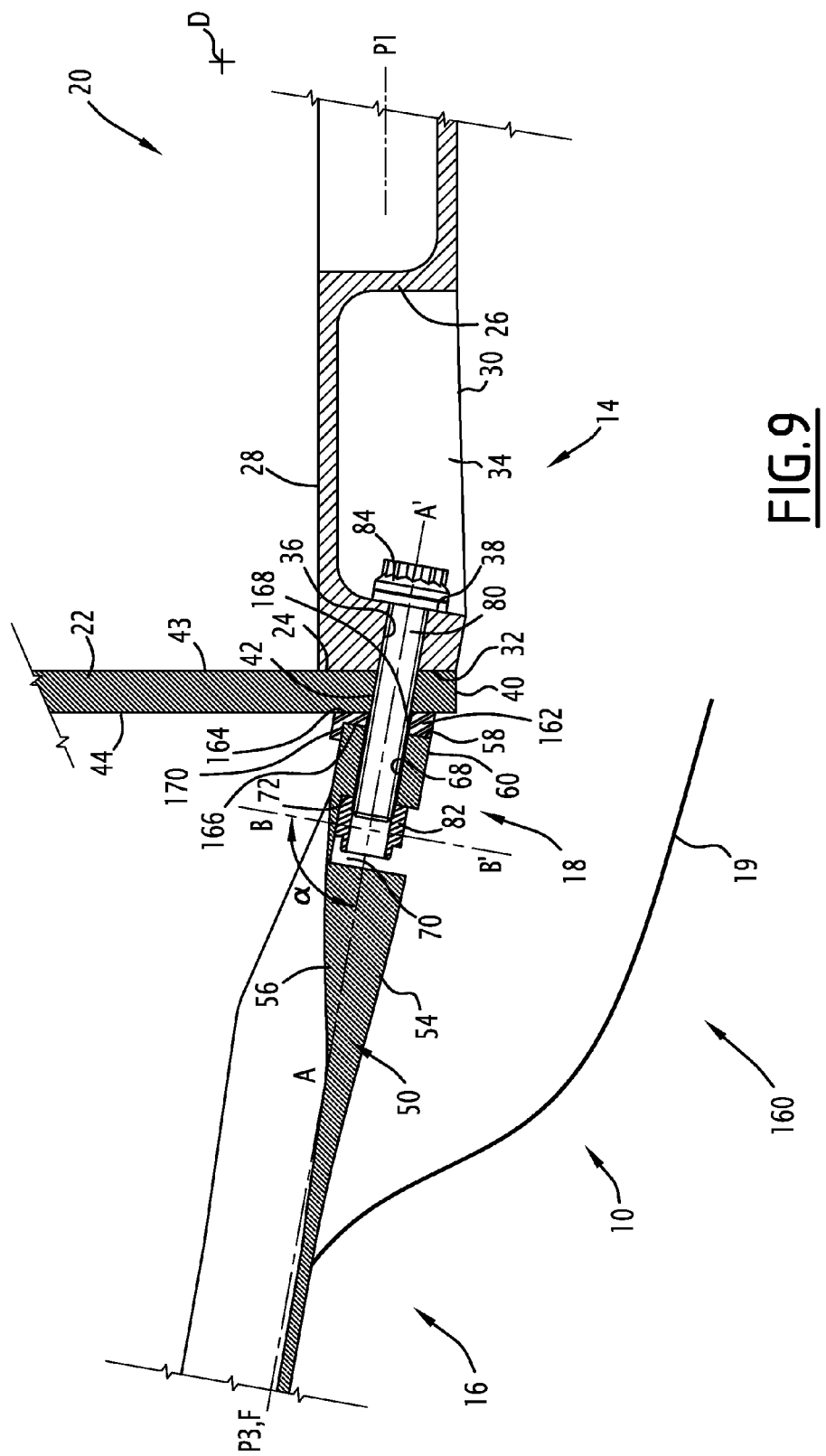
FIG. 9 is a sectional view taken along a transverse plane of a structural assembly of an eighth aircraft according to the invention.

A structural assembly 10 of an eighth aircraft 160 according to the invention is illustrated in FIG. 9.

Unlike the assembly 10 as illustrated in FIG. 3, the section 58 of the composite wall 50 extends in a plane perpendicular to the general plane P3 in the vicinity of the side edge 60. The plane of the second section 58 is tilted relatively to the plane of the first section 32 of the structural wall 26.

An intermediate shim 162 is positioned between the first section 32 and the second section 58, advantageously bearing upon the outer surface 44 of the side junction panel 22.

The shim 162 has a planar interior surface 164, substantially parallel to the plane of the first section 32 and an outer planar surface 166, substantially parallel to the plane of the second section 58.

The shim 162 delimits an interior passage 168 opening out into the surfaces 164 and 166. The interior passage 168 extends along the axis A-A' when the shim 162 is interposed between the composite wall 50 and the junction plate 22.

The shim 162 further comprises an upper edge 170 bearing upon the second surface 56.

During the mounting of the assembly 10, the shim 162 is interposed between the second section 58 and the surface 44, before mounting the attachment means 18. Thus, the axis A-A' of the second passage 68 remains parallel to the general plane P3 of the composite wall 50 and to its neutral fiber F.

Figure 10:
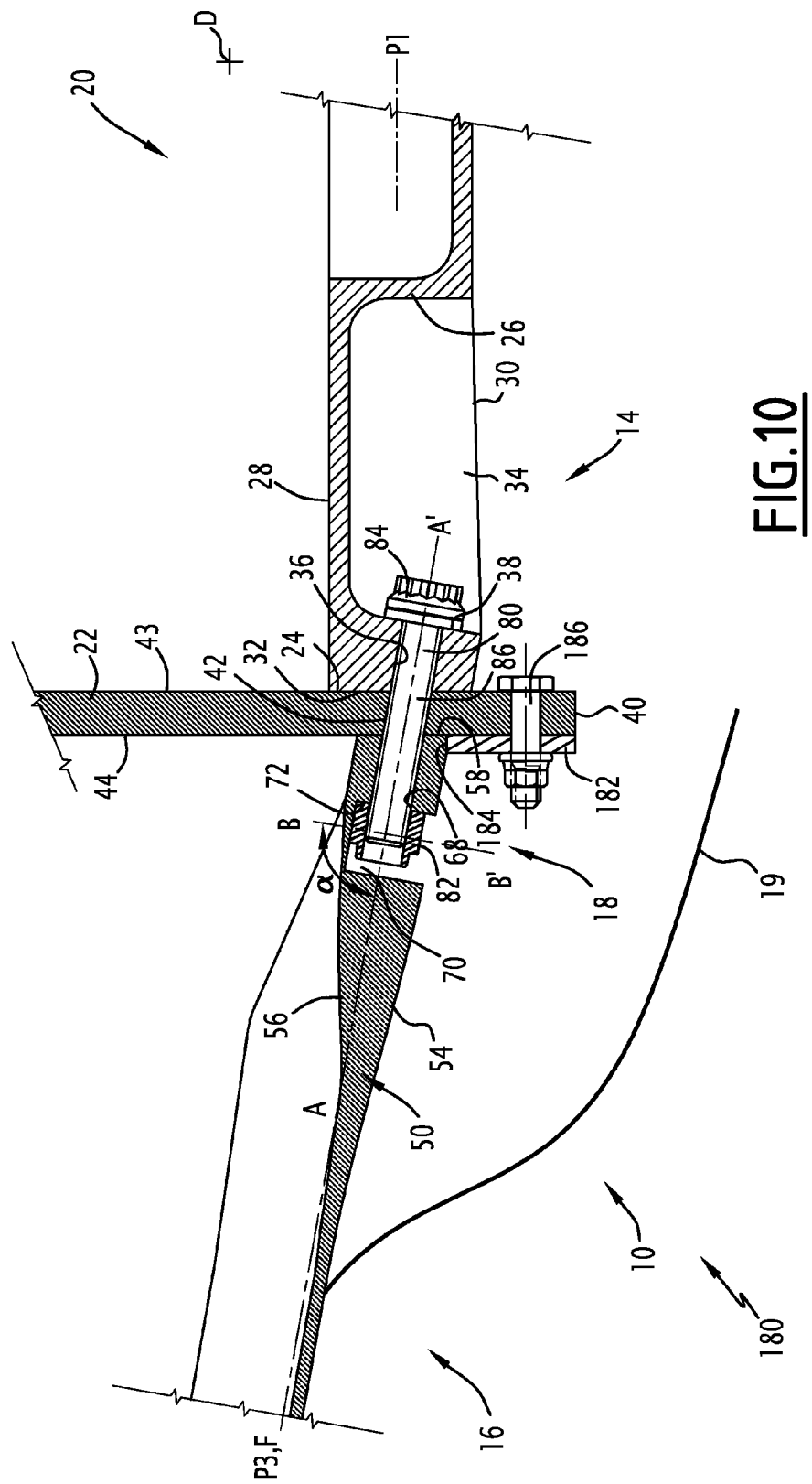
FIG. 10 is a sectional view taken along a transverse plane of a structural assembly of a ninth aircraft according to the invention.

A structural assembly 10 of a ninth aircraft 180 according to the invention is illustrated in FIG. 10.

Unlike the assembly 10 of the third aircraft 110 illustrated in FIG. 3, the assembly 10 comprises a retaining abutment 182 applied under the composite wall 50 while being attached on the outer surface 44 of the side junction panel 22.

The abutment 182 thus includes an upper surface 184 positioned as a support under the first surface 54 at the second section 58. The retaining abutment 182 is fixed against the outer surface 44 with a tension bolt 186. Thus, the abutment 182 allows cancellation of the transverse force generated by the attachment means 18.

Figure 11:
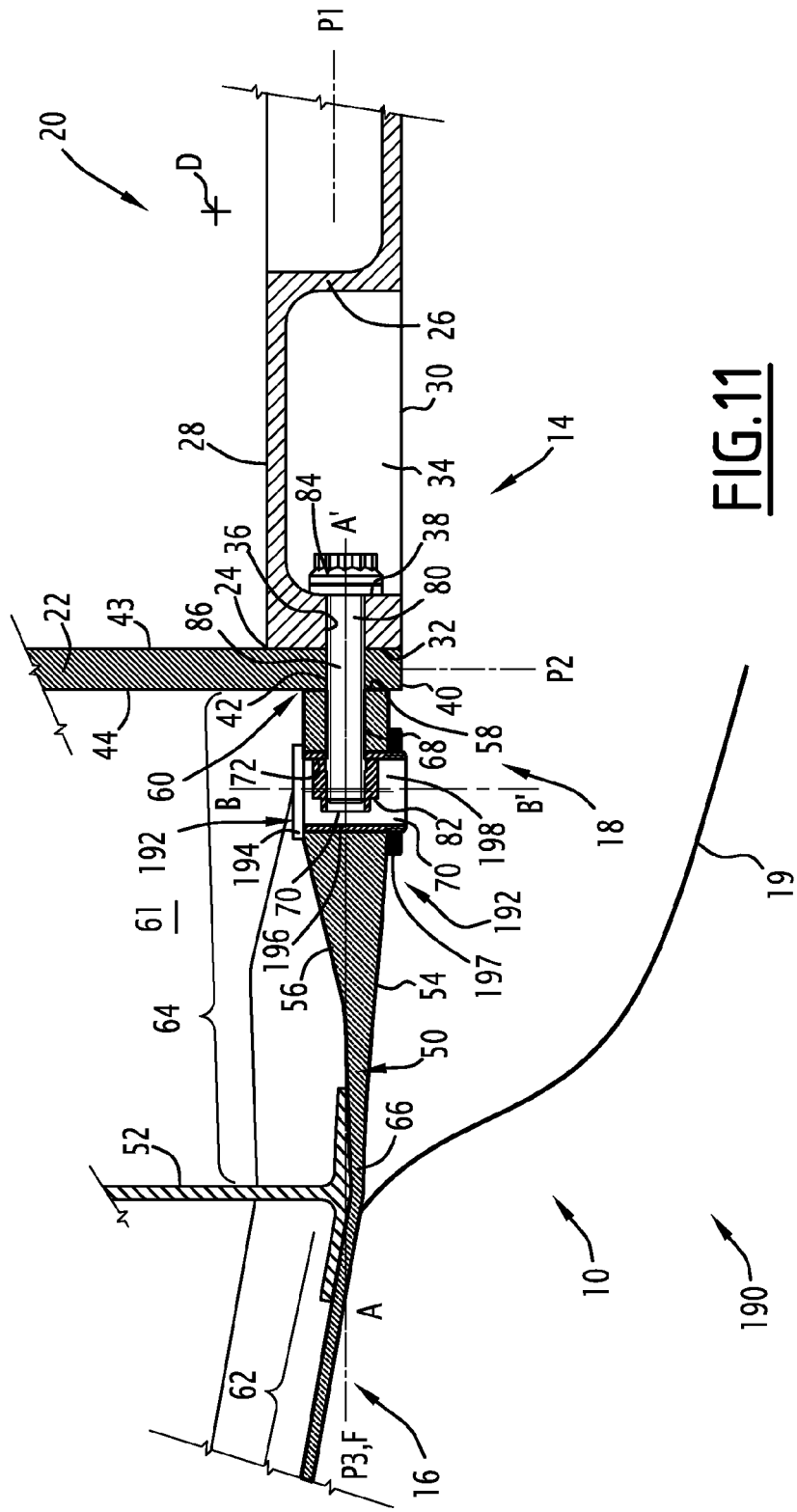
FIG. 11 is a sectional view taken along a transverse plane of a structural assembly of a tenth aircraft according to the invention.

A structural assembly 10 of a tenth aircraft 190 according to the invention is illustrated in FIG. 11.

Unlike the assembly 10 of the first aircraft 12, the cavity 70 is a through-cavity, so that it opens out into the first surface 54 and into the second surface 56.

In order to ensure the seal toward the fluid optionally contained in the tank 61, a closure plug 192 is inserted into the cavity 70. This plug 192 includes an obturation wall 194 applied onto the second surface 54, a hollow body 196 intended to receive the locking member 82. The hollow body 196 has at its end opposite to the wall 194 a threaded portion adapted so as to cooperate with a fastening nut 197.

The hollow body 196 opens out downwards through an aperture for inserting the locking member 82 and opens out laterally through an aperture for letting through the longitudinal element 80, which extends facing the second passage 68.

In an alternative, the plug 192 is provided in each of the assemblies 10 illustrated in FIGS. 1 to 10, in the case when the cavity 70 is a through-cavity.

Figure 12:
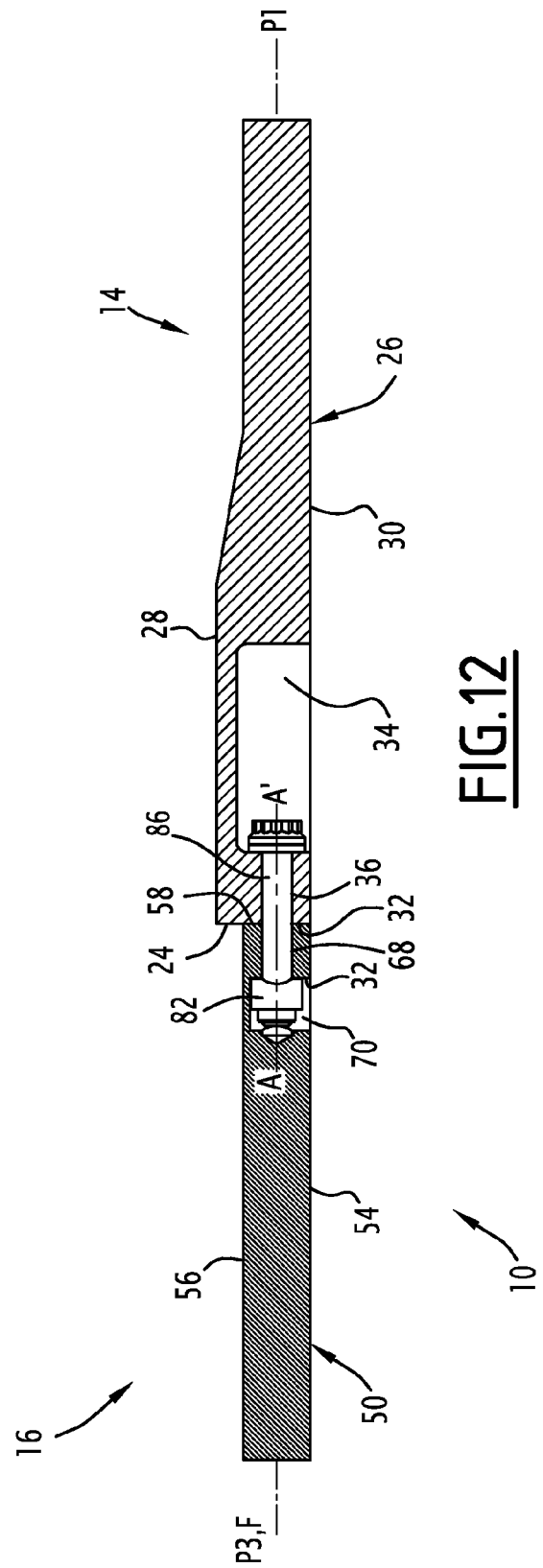
FIG. 12 is a sectional view taken along a transverse plane of a structural assembly of an eleventh assembly according to the invention.

FIG. 12 illustrates a structural assembly 10 of an alternative aircraft according to the invention. In this assembly 10, the first structural element 14 is without any side junction panel 22.

The composite wall 50 is directly attached onto the structural wall 26 through their respective sections 32, 58 which are applied onto each other.

In this example, the composite wall 50 extends in a general plane P3 which is parallel to the general plane P1 of the structural wall 26. The sections 32, 58 are perpendicular to the planes P1 and P3.

The first through-passage 36 opens out exteriorly into the second passage 68. The common axis A-A' of the first passage 36 and of the second passage 68 extends substantially parallel to the general plane P3 of the composite wall 50.

The assembling of the structural assembly 10 illustrated in FIG. 12 differs from the assembling of the assembly 10 illustrated in FIG. 1 in that the section 58 of the composite wall 50 is applied onto the section 32 of the structural wall 26.

Next, as described earlier, the rod 86 of the longitudinal clamping element 80 is successively introduced into the first passage 36 and then into the second passage 68 via the cell 34 in order to be received in the locking member 82 introduced beforehand into the cavity 70.

Figure 14:
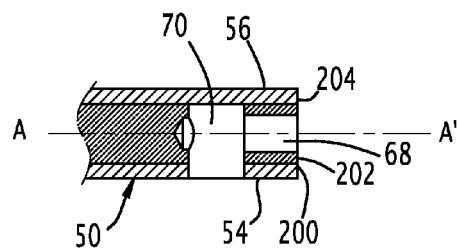
FIG. 14 is a sectional view taken along a transverse plane of a detail of a composite wall of a structural assembly according to the invention.

FIG. 14 illustrates and advantageous exemplary embodiment of the composite wall 50 which may be applied to all the assemblies 10 described earlier in which the cavity 70 is a blind cavity.

In this case, in order to avoid any excessive interlaminar shear stress perpendicular to the locking member 82, the composite wall 50 is formed by a laminar assembly of composite layers 200, 202, 204.

This assembly includes a central layer 202 interposed between a first surface layer 200 delimiting the first surface 54 and a second surface layer 204 delimiting the second surface 56.

The second layer 204 thus obturates the cavity 70 which is transversally made through the central layer 202 and the first layer 200 in order to open out into the first surface 54.

The second passage 68 is made in the central layer 202. It exclusively opens out into the section of the central layer 202.

In order to avoid the occurrence of possible delamination, the layers 200, 204 which are located above and underneath respectively of the locking member 82 are mechanically loaded as less as possible.

For this purpose, the layers 200, 204 are advantageously made from a drape which includes as few folds as possible in a direction said to be at 0°, corresponding to the projection of the direction defined by the axis A-A' on the plane of the composite wall 50.

On the contrary, the central layer 202 advantageously comprises folds which are not oriented at 0°, and has a number of folds oriented at 0° which is greater than the number of folds oriented at 0° in the layers 200, 204. With the orientation of the folds of the layer 202, it is thereby possible to provide the composite wall 50 with satisfactory mechanical strength in particular in the axis A-A'.

Finally, according to a non-illustrated embodiment of the invention, the blind cavity 70 opens out not into the outer surface 54 but into the inner surface 56. This may be advantageous in particular for aircraft of large dimensions.

It naturally follows from the description above, that in an alternative of the embodiments of FIG. 11 and of FIG. 12, the mean plane P3 of the composite wall 50 is tilted by a non-zero angle relatively to the mean plane P1 of the structural wall 26.

As described above, the mean plane P3 of the composite wall 50 is generally defined in the second section 58 by the neutral fiber F of the composite wall 50.

In particular, the mean plane P3 may be defined by the plane tangent to the neutral fiber F at the intersection between the neutral fiber F and the second section 58.

The mean plane P1 of the structural wall 26 is perpendicular to the first section 32 of the structural wall 26.

According to the invention, a mean plane P1 of the structural wall 26 in the vicinity of the first section may with a mean plane P3 of the composite wall 50 in the vicinity of the second section 58, define a non-zero angle of more than 0° and less than or equal to 30°.

This angle is advantageously greater than 5', and is for example greater than 10°.

In a particular alternative, this angle is comprised between 8° and 18°.

The invention claimed is:

1. An aircraft structural assembly, comprising:
   an aircraft structural supporting wall having a first section along a first edge;
   an aircraft composite wall assembled on the structural wall, the composite wall extending in an extension of the structural wall beyond the first edge and defining a second section positioned facing the first section;
   an attachment device attaching the structural wall to the composite wall including at least one elongated traction element received in a first passage made in the structural wall, the first passage opening out into the first section and into a cell made in the structural wall,
   wherein the composite wall defines a second passage opening out into the second section and receiving the elongated element,
   wherein the attachment device comprises a locking member added onto the elongated element, the composite wall delimiting an access cavity connecting a surface of the composite wall to the second passage, the locking member being received into the access cavity, and in that the composite wall extends in a mean plane tilted at an angle greater than 5° relative to a mean plane of the structural wall.

2. The assembly according to claim 1, wherein said surface of the composite wall is the outer surface of this wall.

3. The assembly according to claim 1, wherein the elongated element comprises a rod and a retaining head protruding radially at one end of the rod, the retaining head being received into the cell.

4. The assembly according to claim 1, wherein the mean plane of the structural wall in the vicinity of the first section defines with the mean plane of the composite wall in the vicinity of the second section, an angle comprised between 0° and 30°.

5. The assembly according to claim 1, wherein an angle formed between an axis of the access cavity and the mean plane along which the composite wall extends is between 60° and 120°.

6. The assembly according to claim 1, wherein an axis of the elongated element in the second passage is aligned or parallel with a neutral fiber of the composite wall.

7. The assembly according to claim 1, wherein the axis of the elongated element is tilted relative to the neutral fiber of the composite wall, and an intersection between the axis of the elongated element in the second passage and the neutral fiber being located in the vicinity of the junction between the second passage and the access cavity.

8. The assembly according to claim 1, wherein the access cavity (70) is a blind cavity.

9. The assembly according to claim 1, wherein the access cavity opens out into another surface of the composite wall, and
   wherein the assembly further comprises a member obturating at least one end of the access cavity, added in the access cavity.

10. The assembly according to claim 1, wherein the composite wall comprises a central layer in which is made the second passage and two opposite layers located on either side of the central layer, the central layer having a drape distinct from a drape of the opposite layers, the drape of the central layer having a greater number of folds oriented parallel to the axis of the elongated element than the number of folds oriented parallel to the axis of the elongated element in the drape of the opposite layers.

11. The assembly according to claim 1, further comprising a side junction panel transversely interposed between the first section and the second section.

12. The assembly according to claim 1, wherein the first section substantially extends in a plane tilted relative to the plane of the second section,
   wherein the assembly further comprises an intermediate shim having a surface bearing upon the second section, on which is applied the second section and an opposite surface parallel to the plane of the first section.

13. The assembly according to claim 1, wherein the composite wall forms a skin for a bearing structure box and, the structural wall defines a central structure box portion of an aircraft.

14. The assembly according to claim 13, wherein the structure box is a lower panel or an upper panel for a wing, for a central plane or for a tail.

15. A method for assembling an aircraft structural assembly comprising the following steps:
   providing a structural wall having a first section along a first edge and a composite wall assembled on the structural wall;
   positioning the composite wall in an extension of the structural wall beyond the first edge in order to place said first section facing a second section of the composite wall;

extending the composite wall in a mean plane tilted at an angle greater then 5° relative to a mean plane of the structural wall;

introducing an elongated traction element into a first passage made in the structural wall, the first passage opening out into the first section and into a cell made in the structural wall, and into a second passage of the composite wall and opening out into the second section;

introducing a locking member into an access cavity delimited by the composite wall, the access cavity connecting a surface of the composite wall to the second passage; and engaging the elongated traction element with the locking member in order to mechanically lock the composite wall with the structural wall such that the composite wall extends at an angle greater then 5° relative to the mean plane of the structural wall.

16. An aircraft structural assembly, comprising:

a structural supporting wall having a first section along a first edge;

a composite wall assembled on the structural wall, the composite wall extending in an extension of the structural wall beyond the first edge and defining a second section positioned facing the first section;

an attachment device attaching the structural wall to the composite wall including at least one elongated traction element received in a first passage made in the structural wall, the first passage opening out into the first section and into a cell made in the structural wall, wherein the composite wall defines a second passage opening out into the second section and receiving the elongated element, wherein the attachment device comprises a locking member added onto the elongated element, the composite wall delimiting an access cavity connecting a surface of the composite wall to the second passage, the locking member being received into the access cavity, and in that the composite wall extends in a mean plane tilted relative to a mean plane of the structural wall, wherein the composite wall includes an outer surface at least partly tilted with respect to the mean plane of the structural supporting wall, at least a portion of the outer surface being configured for contact with a mass of air in which the aircraft flies; and an inner surface, at least a portion of the inner surface being configured to delimit an interior fluid tank.

17. An aircraft structural assembly, comprising:

a structural supporting wall having a first section along a first edge;

a composite wall assembled on the structural wall, the composite wall extending in an extension of the structural wall beyond the first edge and defining a second section positioned facing the first section;

an attachment device attaching the structural wall to the composite wall including at least one elongated traction element received in a first passage made in the structural wall, the first passage opening out into the first section and into a cell made in the structural wall, wherein the composite wall defines a second passage opening out into the second section and receiving the elongated element, wherein the attachment device comprises a locking member added onto the elongated element, the composite wall delimiting an access cavity connecting a surface of the composite wall to the second passage, the locking member being received into the access cavity, and in that the composite wall extends in a mean plane tilted relative to a mean plane of the structural wall; and at least one compression member providing transverse compression of the composite wall, the at least one compression member passing through the composite wall between the outer surface and an opposite inner surface, while being located away from the second passage.

* * * * *